United States Patent [19]

Babbit et al.

[11] 3,811,897

[45] May 21, 1974

[54] METHOD FOR INCREASING THE VISCOSITY OF DILUTE PHOTOGRAPHIC EMULSIONS AND ELEMENTS PREPARED THEREBY

[75] Inventors: John M. Babbit; Richard W. Spayd; Nayyir F. Irani, all of Rochester, N.Y.

[73] Assignee: Eastman Kodak Company, Rochester, N.Y.

[22] Filed: Mar. 29, 1972

[21] Appl. No.: 239,389

[52] U.S. Cl. ................................... 96/114, 260/8
[51] Int. Cl. ............................................. G03c 1/04
[58] Field of Search ........................................ 96/114

[56] References Cited
UNITED STATES PATENTS
3,241,969   3/1966   Hart et al. ............................ 96/114

Primary Examiner—Ronald H. Smith
Attorney, Agent, or Firm—Mr. Carl O. Thomas

[57] ABSTRACT

A method for increasing the viscosity of dilute solutions of hydrophilic colloids is desired, by incorporating therein a viscosity increasing concentration of a polymer comprising at least about 50 mole percent of units of the structure:

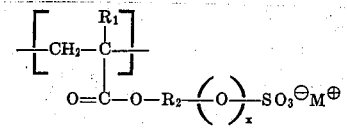

wherein $R_1$ is hydrogen or a lower alkyl group of from one to four carbon atoms, $R_2$ is a lower alkylene group of from one to four carbon atoms, x is zero or one and M is a moiety selected from the group consisting of ammonium, alkali metal cations, salt-forming amines and mixtures thereof.

8 Claims, No Drawings

METHOD FOR INCREASING THE VISCOSITY OF DILUTE PHOTOGRAPHIC EMULSIONS AND ELEMENTS PREPARED THEREBY

BACKGROUND OF THE INVENTION

1. Field of the Invention

This invention relates to the use of viscosity-increasing materials or thickening agents in dilute aqueous compositions of hydrophilic colloids. In one specific aspect, this invention relates to the incorporation of polymers having sulfate or sulfonate moieties as thickening agents in dilute gelatin photographic emulsions to improve the coatability thereof and to photographic elements prepared thereby.

2. Description of the Prior Art

It is well-known that most photographic emulsions contain hydrophilic colloids, usually gelatin. It is also known that low gelatin concentrations permit coating of thin layers. Various thickening agents which have been used to facilitate the coating of dilute photographic emulsions include: carboxy-methylated carbohydrates, cellulose derivatives, carrageenans, alginic acid, various acrylic acid polymers, water-soluble sulfonate polymers, pectic polysaccharides (Belgian Pat. No. 611,623), dextran (U.S. Pat. No. 3,063,838) and certain other polysaccharides (U.S. Pat. Nos. 2,942,974; 3,085,009 and 3,338,716 and Belgian Pat. No. 665,862). None of these materials has been entirely satisfactory and they exhibit problems producing haze, coagulation, brittleness, etc.

Materials used previously as viscosity increasers for hydrophilic colloids have exhibited still other problems such as salt-sensitivity, wherein reduced viscosity improvements are obtained in the presence of water-soluble salts. Increases in viscosity have also been restrained by particular pH environments and the presence of polyvalent cations like cadmium. The deleterious effect of polyvalent cations is most characteristic with thickening agents having carboxyl groups.

However, improved silver halide emulsions having low gelatin content and increased viscosity are desired in order to coat improved thin layers in photographic elements without substantially affecting the other physical and photographic properties of the element.

Smith et al., U.S. Pat. No. 3,615,624 issued Oct. 26, 1971, describe the use of polymers containing sulfide sulfur atoms as peptizers in the production of photographic silver halide emulsions. Also present in such polymers can be moieties derived from α,β-ethylenically unsaturated sulfonates such as 3-acryloyloxypropane-1-sulfonic acid, sodium salt and 3-acryloyloxy-1-methylpropane-1-sulfonic acid, sodium salt; and α,β-ethylenically unsaturated sulfates such as sodium methacryloyl-oxyethyl sulfate. Hollister, U.S. Pat. No. 3,536,677, issued Oct. 27, 1970, describes other polymers containing sulfate or sulfonate groups which can be employed as peptizers in the making of photographic silver halide emulsions. Neither of these patents, however, disclose or suggest the use of polymers containing sulfate or sulfonate groups for increasing the viscosity of emulsions which have been peptized with hydrophilic colloids such as gelatin.

Accordingly, an object of this invention is to increase the viscosity of photographic hydrophilic colloid solutions, including gelatin solutions.

Other objects of this invention are to coat dilute hydrophilic colloid solutions of increased viscosity and to produce photographic elements using such colloid solutions.

Still other objects and advantages of the present invention will become apparent from a reading of the specification and claims.

SUMMARY OF THE INVENTION

The present invention comprises an improved method of increasing the viscosity of dilute solutions of hydrophilic colloids, e.g., gelatin solutions, by adding thereto polymers containing sulfate or sulfonate groups.

More particularly, the present invention comprises a method for increasing the viscosity of dilute solutions of hydrophilic colloids by incorporating therein a viscosity increasing concentration of a polymer comprising at least about 50 mole percent of units of the structure:

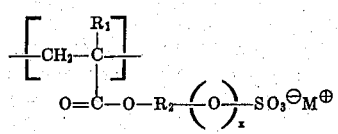

wherein $R_1$ is hydrogen or a lower alkyl group of from one to four carbon atoms, $R_2$ is a lower alkylene group of from one to four carbon atoms, x is zero or one and M is a moiety selected from the group consisting of ammonium, alkali metal cations, salt-forming amines and mixtures thereof.

Viscosity increasing concentrations are widely variable, but ranges of about 0.001 to about 0.5 percent by weight, based on the colloid, are typical. Polymers of the present types are especially useful in aqueous hydrophilic colloid solutions wherein the colloid is present in an amount of from about 0.1 to about 6 weight percent, preferably about 0.1 to about 4 weight percent based on the total solution weight. Solutions of hydrophilic colloids, particularly aqueous solutions of hydrophilic colloids, are useful in photographic applications and can comprise photographic silver halide emulsions. Such solutions and emulsions can be used to advantage when coated to form photographic layers, for example as an integral photographic layer in a photographic element.

The practice of the invention as herein disclosed is a useful method of improving coating quality and versatility. The use of the viscosity increasing polymers of this invention permits bead coating of more concentrated integral layers in photographic elements by the elimination of some of the gelatin vehicle without decreasing viscosity. The practice of the invention results in photographic elements of increased sharpness and faster processing characteristics without loss of coating uniformity. The compositions employed in the practice of this invention permit the combination of more layers into single multiple-hopper packs. They also facilitate the replacement of gelatin by other hydrophilic colloids, such as, for example, synthetic polymers where there is a desire for faster drying, flexibility, improved covering power and dimensional stability, said polymers often contributing too low a viscosity when used alone to allow good coating quality. These compositions do not require the use of special hardeners to improve emulsion characteristics since conventional hydrophilic colloid hardeners such as gelatin hardeners can be used to harden the emulsions.

DESCRIPTION OF THE PREFERRED EMBODIMENTS

The sulfate and sulfonate group-containing polymers of this invention are especially useful for increasing the viscosity of aqueous colloid solutions wherein the colloid ranges from about 0.1 to about 6 percent by weight, based on total solution weight. Most generally, viscosity increasing concentrations range from about 0.001 to about 0.5 weight percent, preferably from 0.001 to about 0.2 weight percent, based on the colloid, but more extensive variations are possible where desired. A wide range of hydrophilic colloid solutions can be increased in viscosity with polymers of the present types, and they are especially useful for thickening photographic hydrophilic colloid solutions.

The colloidal materials whose properties are improved by the polymers employed in the practice of this invention are those whose aqueous dispersions are recognized as useful as vehicles in integral layer photographic elements. Included are gelatins, glues, pigmented gelatins, gelatin derivatives and other colloidal materials such as, for example, poly(acrylamide), poly(vinyl alcohol), poly(vinyl pyrrolidone), and the like. In one embodiment, the preferred hydrophilic colloid is gelatin.

As stated above, the viscosity increasing compositions employed in the practice of this invention are polymers comprising at least about 50 mole percent of units of the structure:

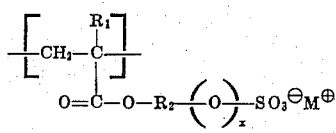

wherein $R_1$ is hydrogen or a lower alkyl group of from one to four carbon atoms, $R_2$ is a lower alkylene group of from one to four carbon atoms, x is zero or one and M is a moiety selected from the group consisting of ammonium, alkali metal cations, salt-forming amines and mixtures thereof.

Exemplary of the lower alkyl groups which can be employed as $R_1$ are methyl, ethyl, propyl, isopropyl, butyl, isobutyl, sec.-butyl and tert.-butyl groups. It is preferred that $R_1$ be hydrogen or methyl. Methyl is most preferred.

$R_2$ can be methylene, ethylene, trimethylene, tetramethylene, or isomers thereof.

The methods for preparing the polymers employed in the practice of this invention and the methods for preparing the monomers from which such polymers are derived are well-known to those skilled in the art. Any of these methods may be employed, none of such methods being critical to the practice of this invention.

As exemplary of esters which can be combined with any suitable base to form the sulfate or sulfonate salt units of the polymers employed in the practice of this invention can be listed:

| Structure | Name |
|---|---|
| $CH_2=CH$<br>$O=C-O-CH_2-SO_3H$ | Acryloyloxymethyl bisulfite. |
| $CH_2=CH$<br>$O=C-O-CH_2-SO_4H$ | Acryloyloxymethyl bisulfate. |
| $CH_3$<br>$CH_2=C$<br>$O=C-O-CH_2-SO_3H$ | Methacryloyloxymethyl bisulfite. |
| $CH_3$<br>$CH_2=C$<br>$O=C-O-CH_2-SO_4H$ | Methacryloyloxymethyl bisulfate. |
| $CH_2=CH$<br>$O=C-O-CH_2-CH_2-SO_3H$ | Acryloyloxyethyl bisulfite. |
| $CH_2=CH$<br>$O=C-O-CH_2-CH_2-SO_4H$ | Acryloyloxyethyl bisulfate. |
| $CH_3$<br>$CH_2=C$<br>$O=C-O-CH_2-CH_2-SO_3H$ | Methacryloyloxyethyl bisulfite. |
| $CH_3$<br>$CH_2=C$<br>$O=C-O-CH_2-CH_2-SO_4H$ | Methacryloyloxyethyl bisulfate. |
| $CH_2=CH$<br>$O=C-O-CH_2-CH_2-CH_2-SO_3H$ | Acryloyloxypropyl bisulfite. |
| $CH_2=CH$<br>$O=C-O-CH_2-CH_2-CH_2-SO_4H$ | Acryloyloxypropyl bisulfate. |
| $CH_3$<br>$CH_2=C$<br>$O=C-O-CH_2-CH_2-CH_2-SO_3H$ | Methacryloyloxypropyl bisulfite. |
| $CH_3$<br>$CH_2=C$<br>$O=C-O-CH_2-CH_2-CH_2-SO_4H$ | Methacryloyloxypropyl bisulfate. |
| $CH_2=CH$<br>$O=C-O-(CH_2)_4-SO_3H$ | Acryloyloxybutyl bisulfite. |
| $CH_2=CH$<br>$O=C-O-(CH_2)_4-SO_4H$ | Acryloyloxybutyl bisulfate. |
| $CH_3$<br>$CH_2=C$<br>$O=C-O-(CH_2)_4-SO_3H$ | Methacryloyloxybutyl bisulfite. |
| $CH_3$<br>$CH_2=C$<br>$O=C-O-(CH_2)_4-SO_4H$ | Methacryloyloxybutyl bisulfate. |

The foregoing is not intended to imply that it is necessary to the practice of the present invention that such esters first be prepared in the monoprotic form listed and then converted to a salt by reaction with a base. Rather, the acid form of the ester has been employed merely as a convenient means for setting forth clearly the chemical structures of the sulfates and sulfonates to be employed. Those skilled in the art will realize that these esters can be synthesized directly in the salt form without ever actually existing in the acid forms shown.

Generally, the sulfate or sulfonate esters employed in the practice of this invention will be ammonium or alkali metal salts, e.g., sodium salts or potassium salts. It is also within the scope of this invention, however, that the cationic moiety of these salts be derived from other compounds which are bases in the sense of being election pair donors. For example, these salts may be derived by interaction with primary secondary or tertiary amines, either aliphatic or aromatic. As exemplary of such amines may be listed methylamine, ethylamine, diethylamine, pentylamine, pyridine, quinoline, piperazine, piperidine and the like.

The polymers of this invention can be either homopolymers or copolymers wherein the sulfate or sulfonate bearing ester comprises at least 50 percent, more preferably at least about 65 percent and most preferably at least about 80 percent on a molar basis, of the polymer. As employed herein, the term copolymer is intended to include polymers derived from two or more monomeric species, that is to say, terpolymers, tetrapolymers and the like are included.

Polymerization can be carried out by any suitable means familiar to those skilled in the art. The reaction can be carried out in bulk, suspension, solution or emulsion, and catalysts, particularly free radical generating catalysts, will generally be employed.

Where copolymers are used, any copolymerizable monomeric species can be employed which will not have an adverse effect upon the photographic emulsion. Among those monomers which can be selected are $\alpha,\beta$-ethylenically unsaturated hydrocarbons, e.g., ethylene, propylene, styrene, etc.; vinyl esters, e.g., vinyl acetate, vinyl propionate, vinyl butyrate, etc.; vinyl ethers, e.g., methyl vinyl ether, ethyl vinyl ether, etc.; acrylic and methacrylic acids, esters and amides, e.g., acrylic acid, methacrylic acid, ethyl acrylate, methyl methacrylate, acrylamide, methacrylamide, 2-acetoacetoxyethyl methacrylate, methacryloyloxyethylacetoacetamide, thiapentyl acrylate, thiapentyl methacrylate, N-(3-thiapentyl) methacrylamide and the like.

Dilute compositions thickened as described can be coated on a wide variety of supports in single- or multilayer photographic elements, for example, as disclosed in Russell, U.S. Pat. No. 2,761,791 issued Sept. 4, 1966. The compositions of this invention can also be coated by dip-coating methods or methods where high viscosity is quite advantageous such as in extrusion coating, curtain coating and doctor knife coating. Examples of suitable supports include cellulose nitrate film, cellulose ester film, polyvinyl acetal film, polystyrene film, poly(ethylene terephthalate) film and related films or resinous materials as well as glass, paper, metal and the like. Supports such as paper which are coated with $\alpha$-olefin polymers, particularly polymers of $\alpha$-olefins containing two or more carbon atoms, e.g., polyethylene, polypropylene and ethylene butene copolymers, can also be employed.

Photographic elements can be produced comprising a support and integral layers in which at least one layer comprises a silver halide emulsion, for example, the improved viscosity compositions can be used to coat interlayers, silver halide emulsion layers, dye mordant layers, receiving layers and the like. The compositions of the invention improved as described can be coated in thin, uniform layers thereby permitting a combination of more of said layers into a thin photographic element.

Silver halide photographic emulsions and elements of the invention can be used in various kinds of photographic systems, e.g., monochromatic, orthochromatic, panchromatic, infrared, X-ray and other non-optically sensitized systems. Silver halide photographic emulsions and elements improved as described can be used in color photography, e.g., emulsions containing color-forming couplers or emulsions to be developed by solutions incorporating couplers or other color-generating materials.

The integral layers of a photographic element can be chemically sensitized, e.g., with noble metal sensitizers alone or in combination with sulfur or selenium sensitizers. They can contain spectral sensitizers such as, for example, the cyanines, merocyanines, complex (trinuclear) cyanines, complex merocyanines, styryls and hemicyanines. Sensitizing dyes useful in such integral layers are described, for example, in U.S. Pat. Nos. 2,526,632 and 2,503,776.

The integral layers on a photographic element can also contain development modifiers such as polymeric thioethers, onium salts, polyalkylene glycols, etc. They can contain antifoggants and stabilizers, examples of which include seleninic acids, tetraazaindenes, oxypentamidines, etc.

The following examples are included for a further understanding of the invention.

EXAMPLE I

Control

This Example shows the degree to which gelatin dispersed silver halide grains tend to settle-out after standing for 2 hours at 40°C. Ninety milliliters of a coarse-grained silver bromoiodide emulsion (0.716 kg emulsion/mole Ag, 71.5 g gelatin/mole Ag) is diluted to a total volume of 100 milliliters with distilled water to a concentration of 0.796 kg/mole Ag. The emulsion is added to two 6 inches × 0.5 inch plastic tubes in an upright position and allowed to stand for 2 hours at 40°C. The tubes are then placed in a refrigerator overnight. Starting at the top of each plastic tube, six ⅝ inch slices are removed from the plastic tube at the following center points of each slice: 1. ¼ inch, 2. ¾ inch, 3. 2 ½ inches, 4. 3 inches, 5. 5 ⅝ inches, and 6. 5 ⅞ inches. The samples (two for each slice) are analyzed for silver content. The analyses, averaged for each slice are shown in Table I.

EXAMPLE II

Example I is repeated except that 10 gm. of a 1 percent solution of a homopolymer of sodium methacryloyloxyethyl sulfate is added to dilute the emulsion to a total volume of 100 milliliters rather than the 10 milliliters of distilled water employed therein. The analyses are shown in Table I.

EXAMPLE III

Example II is repeated except that a copolymer of 14/1 (mole ratio) sodium methacryloyloxyethyl sulfate/2-acetoacetoxyethyl methacrylate is substituted for the homopolymer employed therein. The analyses are shown in Table I.

EXAMPLE IV

Example II is repeated except that a copolymer of 2/12/1 (mole ratio) 3-thiapentyl acrylate/sodium methacryloyloxyethyl sulfate/2-acetoacetoxyethyl methacrylate is substituted for the homopolymer employed therein. The analyses are shown in Table I.

TABLE I

| Example | Settling Analyses | | | |
|---|---|---|---|---|
| | I (control) | II | III | IV |
| Level | | | | |
| 1 (top) | *1.91 | *0.840 | *0.965 | *1.24 |
| 2 | 0.765 | 0.725 | 0.758 | 0.781 |
| 3 | 0.757 | 0.719 | 0.751 | 0.786 |
| 4 | 0.759 | 0.720 | 0.750 | 0.778 |
| 5 | 0.736 | 0.710 | 0.734 | 0.764 |
| 6 (bottom) | 0.505 | 0.624 | 0.581 | 0.596 |

*Units are in kg. emulsion/mole Ag

The silver analyses listed in Table I for each level (⅜ inch slice) and each sample show that a. silver halide grains settle to the bottom level (No. 6) more readily when no polymer of this invention is present (Control — 0.505 Ag. emulsion/mole Ag),
b. the least amount of silver halide grain settling takes place when the homopolymer (Example II) is present (0.624 kg emulsion/mole Ag), and
c. in addition to the homopolymer, both the copolymers of Example III and Example IV are better than the all gelatin system for prevention of grain settling.

EXAMPLE V

Example II is repeated except that a homopolymer of 3-methacryloyloxypropane-1-sulfonic acid, sodium salt is substituted for the polymer employed therein. The settling data with this polymer are compared with that of a gelatin control containing no polymeric thickener in Table II.

TABLE II

| | Settling Analyses | |
|---|---|---|
| Vial Level | Gelatin Control | Example V Polymer |
| 1 (top) | 1.26* | 0.941* |
| 2 | 0.776 | 0.771 |
| 3 | 0.770 | 0.770 |
| 4 | 0.768 | 0.765 |
| 5 | 0.752 | 0.756 |
| 6 (bottom) | 0.581 | 0.691 |

*kg emulsion/mole Ag.

EXAMPLE VI

The viscosity of a silver bromoiodide emulsion containing 5 percent gelatin is determined as a function of shear rate both in the absence and in the presence of 0.1 percent by weight of the total composition of the polymers of Examples II, III and IV. The data are shown in Table III and demonstrate that over a range of shear rates, the polymers of this invention substantially increase viscosity.

TABLE III

| | Viscosity as a Function of Shear Rate | | | |
|---|---|---|---|---|
| | | Thickener | | |
| Shear Rate | Control (No Polymer) | Ex. II Polymer | Ex. III Polymer | Ex. IV Polymer |
| 125 sec$^{-1}$ | .019 poise | .148 poise | .099 poise | .084 poise |
| 165 sec$^{-1}$ | .019 poise | .140 poise | .096 poise | .082 poise |
| 215 sec$^{-1}$ | .019 poise | .130 poise | .093 poise | .079 poise |
| 290 sec$^{-1}$ | .019 poise | .122 poise | .089 poise | .076 poise |
| 380 sec$^{-1}$ | .018 poise | .113 poise | .085 poise | .073 poise |
| 550 sec$^{-1}$ | .018 poise | — | .079 poise | .070 poise |

EXAMPLE VII

The viscosities of solutions containing 5 percent by weight gelatin and 0.1 percent by weight of either the polymer of Example II, the polymer of Example IV or the polymer of Example V are determined at a shear rate of 27 sec$^{-1}$ as a function of potassium nitrate concentration. The results, shown in Table IV, show that the polymers of this invention are relatively insensitive to various concentrations of the potassium nitrate.

TABLE IV

| | Viscosity as a Function of KNO$_3$ Concentration | | |
|---|---|---|---|
| | | Thickener | |
| KNO$_3$ Conc | Ex. II Polymer | Ex. IV Polymer | Ex. V Polymer |
| 0 | .351 poise | .206 poise | .431 poise |
| 0.025 molar | .261 poise | .169 poise | .318 poise |
| 0.050 molar | .204 poise | .140 poise | .245 poise |
| 0.100 molar | .138 poise | .108 poise | .160 poise |

EXAMPLE VIII

The viscosities of solutions containing 5 percent by weight gelatin and 0.1 percent by weight of either the polymer of Example II, the polymer of Example IV or the polymer of Example V are determined at a shear rate of 27 sec$^{-1}$ as a function of pH. The results, shown in Table V, show that the viscosities of solutions of gelatin with the polymers of this invention do not change drastically at various pH's and at constant shear rates.

TABLE V

| | Viscosity as a Function of pH | | |
|---|---|---|---|
| | | Thickener | |
| pH | Ex. II Polymer | Ex. IV Polymer | Ex. V Polymer |
| 5.0 | 0.235 poise | 0.154 poise | 0.280 poise |
| 6.0 | 0.280 poise | 0.215 poise | 0.367 poise |
| 7.0 | 0.240 poise | 0.206 poise | 0.276 poise |
| 8.0 | 0.201 poise | 0.202 poise | 0.197 poise |
| 9.0 | 0.178 poise | 0.240 poise | 0.159 poise |

What is claimed is:

1. A method for increasing the viscosity of a dilute aqueous silver halide emulsion containing a hydrophilic colloid in an amount of from about 0.1 to about 6.0 percent by weight of the emulsion which comprises adding thereto a viscosity increasing concentration of a polymer comprising at least about fifty mole percent of units of the structure:

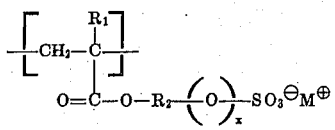

wherein $R_1$ is hydrogen or a lower alkyl group of from one to four carbon atoms, $R_2$ is a lower alkylene group of from one to four carbon atoms, x is zero or one and M is a moiety selected from the group consisting of ammonium, alkali metal cations and salt-forming amines, the concentration of said polymer being in the range of from about 0.001 to about 0.5 weight percent, based on the weight of the hydrophilic colloid.

2. The method of claim 1 wherein the hydrophilic colloid is gelatin.

3. The method of claim 2 wherein the polymer comprises at least about 50 mole percent of units of the structure:

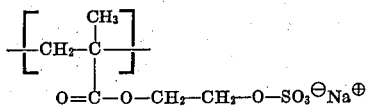

4. The method of claim 2 wherein the polymer comprises at least about 50 mole percent of units of the structure:

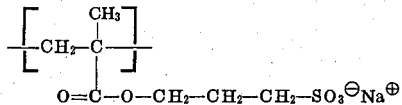

5. A photographic element comprising a support and at least one coating layer prepared by the method of claim 1.

6. A photographic element comprising a support and at least one coating layer prepared by the method of claim 2.

7. A method for increasing the viscosity of a dilute aqueous silver halide emulsion containing a hydrophilic colloid in an amount of from about 0.1 to about 6.0 percent by weight of the emulsion which comprises adding thereto a viscosity increasing concentration of a polymer comprising at least about 50 mole percent of units of the structure:

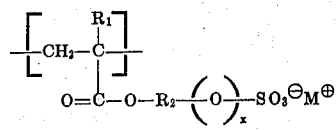

wherein $R_1$ is hydrogen or a lower alkyl group of from one to four carbon atoms, $R_2$ is a lower alkylene group of from one to four carbon atoms and M is a moiety selected from the group consisting of ammonium, alkali metal cations and salt-forming amines, the concentration of said polymer being in the range of from about 0.001 to about 0.5 weight percent, based on the weight of the hydrophilic colloid.

8. The method of claim 7 wherein the hydrophilic colloid is gelatin.

* * * * *